Oct. 21, 1969 H. J. SCHLAFLY, JR 3,473,339
CABLE CONDUIT INSTALLATION
Filed Dec. 21, 1967 2 Sheets-Sheet 1

*INVENTOR.*
Hubert J. Schafly, Jr.
BY
Pennie Edmonds Morton
Taylor & Adams
ATTORNEYS Oct. 21, 1969   H. J. SCHLAFLY, JR   3,473,339
CABLE CONDUIT INSTALLATION
Filed Dec. 21, 1967   2 Sheets-Sheet 2
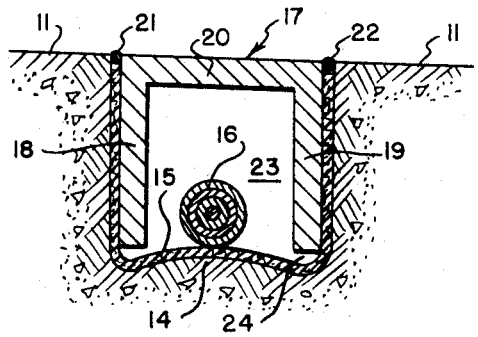
FIG. 6
FIG. 7
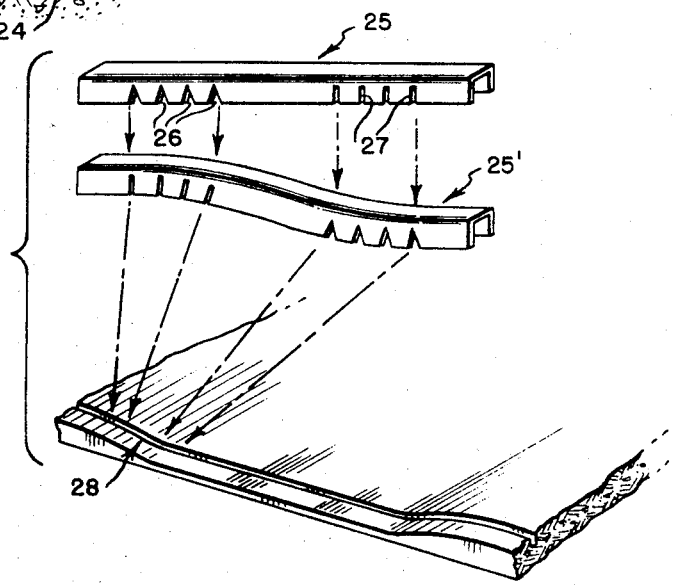
FIG. 8
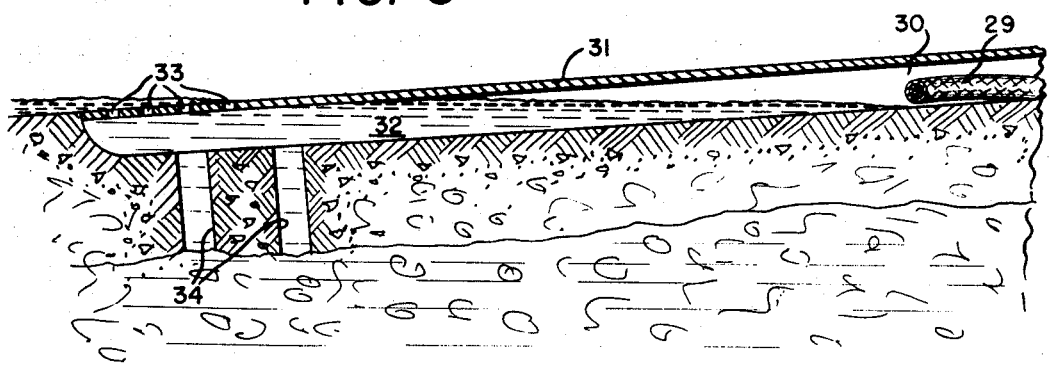
INVENTOR.
Hubert J. Schafly, Jr.
BY
Pennie Edmonds Morton
Taylor & Adams
ATTORNEYS 3,473,339
CABLE CONDUIT INSTALLATION
Hubert J. Schlafly, Jr., Fort Lee, N.J., assignor to Teleprompter Corporation, New York, N.Y., a corporation of New York
Filed Dec. 21, 1967, Ser. No. 692,393
Int. Cl. E02f 5/10
U.S. Cl 61—72.1                                    7 Claims

ABSTRACT OF THE DISCLOSURE

A cable conduit and method for installing the conduit in a sidewalk are shown. A longitudinal trough is first cut in the sidewalk and a strip of flexible, water repellent packing material having a width greater than the trough is placed over the trough. The cable to be installed in the conduit is laid over the packing material along the length of the trough and a U-shaped metal channel is forced into the trough, open side down, carrying the packing material and cable with it so that the top of the channel is flush with the sidewalk and portions of the packing material are compressed between the sides of the channel and the walls of the trough. Means for installing the conduit in a sidewalk having a non-uniform grade and means for facilitating the drainage of the conduit are also disclosed.

BACKGROUND OF THE INVENTION

This invention relates to an electrical cable conduit, and more particularly to an electrical cable conduit adapted for installation in a sidewalk and to a method for installing the conduit in a sidewalk.

Electric power, telephone and communication cables have multiplied in densely populated areas. It is frequently necessary to extend electric cables through such areas and it is desirable that such operations be performed quickly, efficiently and with as little disruptive effect on the site as possible, at the same time installing the cable in a protected and enclosed environment. This invention is directed to satisfying these requirements.

SUMMARY OF THE INVENTION

The present invention provides an electrical cable conduit and a method for installing the conduit in a pavement. The method comprises the steps of cutting a longitudinal trough in the pavement; placing a strip of flexible, water-repellent packing material over the trough, the width of the strip being greater than the width of the trough; laying an electric cable upon the packing material along the length of the trough; and forcing a U-shaped metal channel open side down into the trough. The U-shaped metal channel has two side portions united by a top portion. When the cable conduit is completely installed the top portion of the channel is flush with the top surface of the pavement and a portion of the packing material is compressed between the side portions of the channel and the walls of the trough. The invention also provides means for installing the conduit in a pavement having a nonuniform grade and means for facilitating the drainage of the conduit.

These and further objects and advantages of the present invention will be better understood when the following description is read in connection with the accompanying drawing.

BRIEF DESCRIPTION OF THE DRAWING

In the drawing:

FIG. 6 is a sectional view of the completed cable conduit installation made along line 6—6 of FIG. 5.

FIG. 7 is an exploded perspective view illustrating the method of installing the cable conduit of the present invention along a sidewalk at a drop-curb driveway entrance.

FIG. 8 is a sectional view of a drainage conduit for use with the preferred embodiment of the cable conduit installation.

DESCRIPTION OF THE PREFERRED EMBODIMENT

Figure 1:
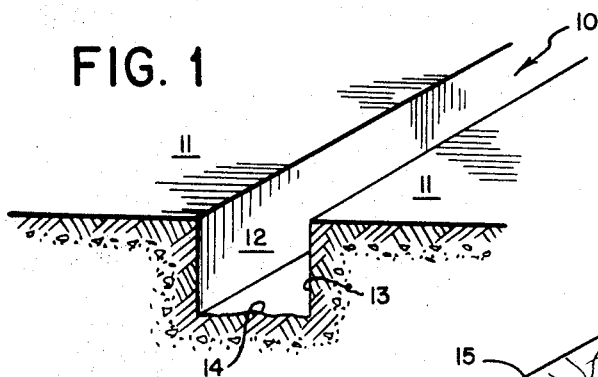
FIGS. 1–5 are perspective views of five successive stages during the installation of a preferred embodiment of the cable conduit in a level sidewalk.

FIG. 1 shows a longitudinal trough 10 cut in a sidewalk 11 in which a preferred embodiment of the cable conduit of this invention is to be installed. To cut the trough, a standard diamond-saw concrete cutting machine normally used for street and sidewalk work may be modified to accommodate two cutting blades so as to make two parallels cuts simultaneously. The blades are mounted so that, for example, the width of the trough 10 is 1⅝ inch and the depth of the trough is 1½ inch for accommodation of a cable one-half inch in diameter. The use of a double-blade cutter assures the parallelism of the vertical side walls 12 and 13 of the trough 10.

After cutting of the side walls 12 and 13 the narrow tongue of sidewalk between them is removed. This operation can be performed by an electric chisel; short segments can be broken off by light taps on a metal wedge inserted into one of the saw cuts. Roughness of the bottom of surface 14 of the trough does not impair the effectiveness of the cable conduit or its installation.

Figure 2:
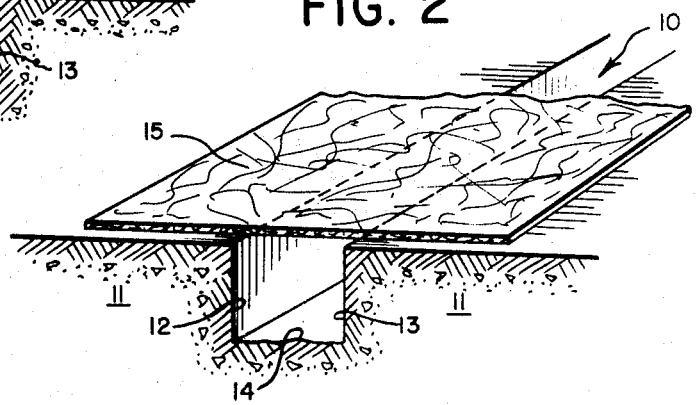
Figure 3:
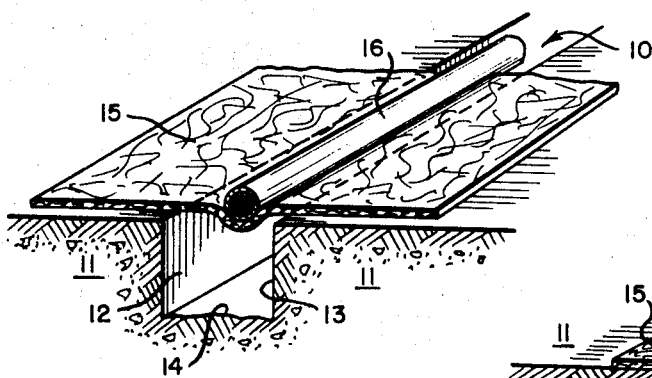

When the trough 10 has been formed in the pavement one or more thicknesses of a soft tar-impregnated fiber or plastic strip of packing material 15 is placed over the trough as illustrated in FIG. 2. The electrical cable 16 to be installed in the conduit is then laid upon the strip or strips of packing material 15, causing it to belly slightly into the trough as shown in FIG. 3. The strip of packing material has a width greater than the width of the trough. The cable 16 may, for example, be a coaxial cable about ½ inch in diameter.

Figure 4:
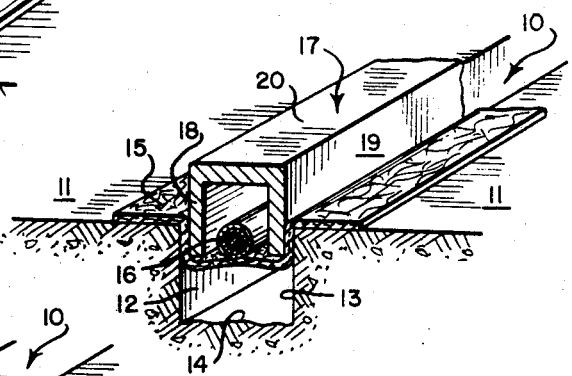

A U-shaped steel channel 17 having two side portions 18 and 19 united by a top portion 20 is next placed over the cable 16 and the packing material 15. This is depicted in FIG. 4. The channel 17 does not sink immediately into the trough 10 because the combined thickness of the packing material 15 and the 1½ inch width of the channel 17 is slightly greater than the width of the trough.

Figure 5:
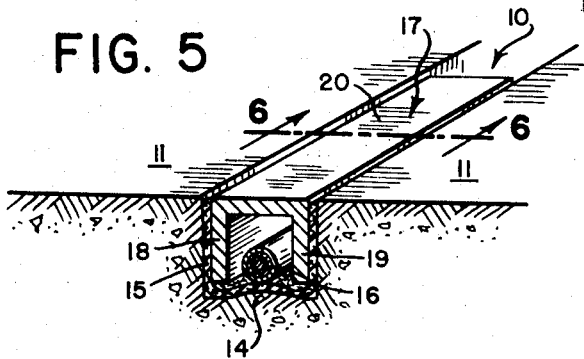

When the channel 17 has been carefully aligned over the trough 10 a sledge hammer is used to force the channel into the trough so that portions of the packing material 15 are compressed between the side portions of the steel channel 17 and the side walls of the trough. The sledging starts at one end of the channel and continues along the length of the trough until the top portion 20 of the channel is flush with the sidewalk surface 11 within a close tolerance. FIG. 5 shows the steel channel in place after the sledging has been completed.

Once the steel channel 17 has been forced into the trough it can be removed only with tools that provide a large amount of upward thrust. The packing material 15 grips the steel channel on both sides continuously along its full length and depth, providing up to 360 square inches of gripping surface per 10 foot length of 1½ inch steel channel. The steel channel 17 can be removed if necessary, however, without damaging or pulling the cable 16 and without additional construction or retrenching. This ease of access has never been possible with buried cables before this invention, and it makes laying additional cables, making splices or taps, and repair and maintenance of the cable hardly more difficult than with an aerial cable installation.

Although the compressible nature of the packing material 15 permits it to act as an expansion joint, the relatively narrow width of the steel channel does not require more than .001 inch for expansion over a 100° F. temperature range. Since the longitudinal expansion of the steel channel 17 is approximately 1/10 inch for every 10 foot length over a 100° F. temperature range, a space of from ⅛ to ¼ inch is left between adjacent 10 foot sections of the channel. These gaps or spaces are filled with a silicone rubber sealant which adheres to the metal and which is self-vulcanizing in air. Such a sealant retains its elasticity at a temperature of −40° F. and is not damaged by temperatures of up to 200° F. The same sealant material, applied with a caulking gun, is used to seal the junction between the steel channel 17 and the sidewalk along the top of the packing material 15. The beads 21 and 22 of silicone sealant can be seen in cross section in FIG. 6.

FIG. 6 also illustrates a feature of the invention which guards the conduit installation against the heaving effect of ice formation within the conduit. The air pocket 23 within the conduit allows any ice at the bottom of the conduit (as, e.g. at 24) to expand harmlessly into the conduit space instead of pushing against the steel channel 17 and heaving the channel out of its installed position.

Although most sidewalks have long stretches of level or constant grade surface conditions, the present invention also provides for contouring the conduit to surfaces having non-uniform grades. FIG. 7 shows the method of contouring a cable conduit for installation along a sidewalk having the "drop-curb" characteristic of a driveway entrance. The side portions of a steel channel 25 to be used in the conduit installation as already described are given a plurality of cuts by means of a hand or power saw. The cuts are either triangular in form, as at 26, or slits as at 27, depending upon whether the contour of the sidewalk is concave or convex. The cuts allow the channel to be deformed as shown at 25' to adapt to the contour of sidewalk location 28.

The contouring installation procedure in a typical situation is as follows. A standard 10 foot length of steel channel is placed on the surface of the sidewalk at the edge of the trough at the exact place where the channel section is to be inserted. A workman inspects the fit, and if the sidewalk is level or of constant grade the section is marked for insertion at this particular spot. If the edge of the steel channel does not conform to the sidewalk the workman marks the side of the channel with a vertical line to indicate a slit cut, or a V to denote a triangular pie-shaped cut, depending on the shape of the sidewalk surface. When corresponding slit or triangular cuts are made in the side portions of the channel the section is again placed in position and leverage is applied to bring the channel into continuous contact with the sidewalk. Additional cuts can be made if necessary.

In situations where the sidewalk discontinuities are so great that the steel channel cannot follow them there are two solutions: (a) a channel can be cut into two sections to conform to the sidewalk condition and the junction between the sections can be fitted with a silicone rubber expansion gasket and the sidewalk discontinuity treated with an epoxy patch; (b) a steel channel can be contoured through the discontinuity so that its upper surface is below the sidewalk level and the remaining recess in the sidewalk is filled in with epoxy or similar material. Similar solutions can be applied to transverse as well as longitudinal discontinuities.

Although both the water-repellent packing material 15 and the sealant caulking will limit the amount of water entering the cable conduit, means for facilitating drainage of the conduit are advantageous. Simple weepholes can be made in the packing material at periodic locations along the bottom of the trough. Where the natural slope of the sidewalk provides for drainage of the conduit toward one end of the channel, the channel can be continued, empty of cable, so that water can drain out of the conduit through holes in the top of the channel. A drainage arrangement is shown in FIG. 8. An electric cable 29 is shown proceeding along a sloping conduit according to the present invention and exiting from the conduit at point 30. The conduit 31 is continued along the sloping sidewalk beyond point 30 a distance sufficient to allow accumulated water 32 to drain out of the conduit through holes 33 drilled in the top surface of the channel. Weepholes 34 are also drilled through the bottom of the conduit. Both the weepholes 34 and the surface holes 33 ensure that the accumulated water 32 in the conduit does not rise above the level of the cable exit 30.

The top surface of the cable conduit installation can be treated to enhance its appearance or non-skid properties. Moreover, although a single coaxial cable has been illustrated in connection with the preferred embodiment of the invention it will be readily understood that the cable conduit can house one or more of a wide variety of cables or their like. Also, the conduit of the preferred embodiment has been shown installed in a sidewalk, but it will be obvious that the present invention has equal applicability to installations of cable conduit in many man-made or natural surfaces.

It will be further understood that various changes in the details, materials, steps and arrangement of parts which have been herein described and illustrated in order to explain the nature of the invention may be made by those skilled in the art within the principle and scope of the invention as expressed in the appended claims.

I claim:
1. A method of installing an electrical cable in a pavement comprising the steps of:
 (1) cutting a longitudinal trough in the pavement;
 (2) placing a strip of flexible, water-repellent packing material over the trough, the width of said strip being greater than the width of said trough;
 (3) laying a cable upon the strip of packing material along the length of the trough;
 (4) positioning a U-shaped metal channel open side down over the cable and packing material along the length of the trough, and
 (5) forcing the channel into the trough.
2. A method according to claim 1 further comprising the step of applying a water-repellent sealant to the juncture between the sidewalk and the top portion of the channel.
3. A cable conduit installation in a longitudinal trough in a pavement comprising:
 (1) a U-shaped metal channel having two side portions united by a top portion;
 (2) a strip of flexible, water-repellent packing material positioned within the trough and having a width greater than the width of said trough; the channel being positioned over the packing material in the trough so that the top portion of the channel is flush with the surface of the pavement and a portion of the packing material is compressed between the side portions of the channel and the walls of the trough.

4. A cable conduit installation according to claim 3 wherein the juncture between the sidewalk surface and the top portion of the channel is substantially sealed with a water-repellent sealant.

5. A cable conduit installation according to claim 3 wherein the side portions of the metal channel have at least one slit cut therein.

6. A cable conduit installation according to claim 3 further comprising means for draining water from said conduit.

7. A cable conduit installation according to claim 3 wherein the top portion of the metal channel is provided with a non-slip surface.

References Cited
UNITED STATES PATENTS

| | | | |
|---|---|---|---|
| 384,948 | 6/1888 | Young | 138—105 |
| 2,007,969 | 7/1935 | Grodsky | 61—72.1 |
| 2,972,968 | 2/1961 | Stafford | 61—72.2 |

JACOB SHAPIRO, Primary Examiner

U.S. Cl. X.R.

61—43; 138—105